US012584606B2

(12) United States Patent
Joo et al.

(10) Patent No.: US 12,584,606 B2
(45) Date of Patent: Mar. 24, 2026

(54) IMAGE VARIABLE LIGHTING APPARATUS

(71) Applicant: HYUNDAI MOBIS CO., LTD., Seoul (KR)

(72) Inventors: Chan Ho Joo, Yongin-si (KR); Hyoung Jin Choi, Yongin-si (KR); Jun Hyuk Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/913,396

(22) Filed: Oct. 11, 2024

(65) Prior Publication Data

US 2025/0305652 A1 Oct. 2, 2025

(30) Foreign Application Priority Data

Mar. 27, 2024 (KR) ........................ 10-2024-0041789

(51) Int. Cl.
*F21S 43/00* (2018.01)
*F21S 43/14* (2018.01)

(52) U.S. Cl.
CPC ............. *F21S 43/601* (2024.05); *F21S 43/14* (2018.01)

(58) Field of Classification Search
None
See application file for complete search history.

(56) References Cited

U.S. PATENT DOCUMENTS

| | | | | |
|---|---|---|---|---|
| 3,739,512 | A * | 6/1973 | Ruppert | B60Q 3/14 200/DIG. 47 |
| 11,551,625 | B1 * | 1/2023 | Staton | F21S 43/255 |
| 11,927,319 | B1 * | 3/2024 | Robertson, Jr. | F21S 41/40 |
| 2006/0092655 | A1 * | 5/2006 | Shen | F21S 43/255 362/539 |
| 2021/0206509 | A1 * | 7/2021 | Hack | G09F 19/12 |
| 2023/0104093 | A1 * | 4/2023 | Bergeler | F21V 14/003 362/471 |
| 2024/0109492 | A1 * | 4/2024 | Anderson | B60R 1/04 |
| 2024/0280741 | A1 * | 8/2024 | Wittmann | G02B 6/0051 |

FOREIGN PATENT DOCUMENTS

KR 10-1040015 B1 6/2011

* cited by examiner

*Primary Examiner* — Christopher E Dunay
(74) *Attorney, Agent, or Firm* — Morgan, Lewis & Bockius LLP

(57) ABSTRACT

Disclosed is an image variable lighting apparatus, including a light source portion configured to emit light forward, and a variable light-transmitting portion configured to be disposed in front of the light source portion, in which light transmittance of the variable light-transmitting portion changes depending on whether an electrical signal is input to the variable light-transmitting portion.

11 Claims, 10 Drawing Sheets

IMAGE VARIABLE LIGHTING APPARATUS

CROSS-REFERENCE TO RELATED APPLICATION

This application claims priority from and the benefit under 35 USC § 119 of Korean Patent Application No. 10-2024-0041789, filed on Mar. 27, 2024, in the Korean Intellectual Property Office, the entire disclosure of which is incorporated by reference for all purposes.

BACKGROUND

Field

Exemplary embodiments of the present disclosure relate to an image variable lighting apparatus capable of changing a displayed image.

Description of the Related Art

An exterior design of a vehicle is an important factor in stimulating a desire to purchase a vehicle. In recent years, an influence of exterior vehicle lighting on a vehicle's exterior design has been gradually increasing. Typical exterior vehicle lighting has fixed lighting-up areas and limited lighting colors depending on a color of a light source, making it insufficient for creating a variety of impressions of a vehicle's exterior.

Furthermore, employing display panels such as LCDs or OLEDs as external vehicle lighting may allow for changes in images and colors through illumination, thus creating a variety of impressions of a vehicle's exterior. However, this approach comes with high costs and high power consumption.

The related art of the present disclosure is disclosed in Korean Patent No. 10-1040015 (registered on Jun. 1, 2011 and entitled "LED Lighting Device For Vehicle").

SUMMARY

Exemplary embodiments of the present disclosure are directed to providing an image variable lighting apparatus capable of changing lighting-up areas and lighting colors and reducing power consumption.

An image variable lighting apparatus according to the embodiments of the present disclosure includes a light source portion configured to emit light forward, and a variable light-transmitting portion configured to be disposed in front of the light source portion, in which light transmittance of the variable light-transmitting portion changes depending on whether an electrical signal is input to the variable light-transmitting portion.

The variable light-transmitting portion may include an electrochromic device or an electrophoretic device.

When the electrical signal is input to the variable light-transmitting portion, light transmission may be blocked in a thickness direction of the variable light-transmitting portion.

When the electrical signal is not input to the variable light-transmitting portion and the light source portion emits light, light emitted by the light source portion may pass through the variable light-transmitting portion.

The image variable lighting apparatus may further include a semi-transparent portion disposed in front of the light source portion and include a semi-transparent paint layer of a predetermined color.

When the electrical signal is not input to the variable light-transmitting portion and the light source portion does not emit light, a color of the paint layer may be visible on a front surface of the image variable lighting apparatus.

The color of the paint layer may be the same as a color of an installation portion where the image variable lighting apparatus is installed.

The light source portion may include a plurality of LED packages. A color of light emitted by LED packages belonging to one group among the plurality of LED packages may differ from a color of light emitted by LED packages belonging to another group.

The variable light-transmitting portion may include a plurality of non-overlapping cells distributed therein, in which light transmittance of the plurality of cells is individually controlled.

The variable light-transmitting portion may include an opaque boundary wall provided between a pair of adjacent cells among the plurality of cells.

The image variable lighting apparatus includes the variable light-transmitting portion where light transmittance changes depending on an electrical signal. Therefore, the apparatus may create various images by changing lighting-up areas and lighting colors.

By applying the image variable lighting apparatus to a vehicle's exterior design, various impressions of a vehicle's exterior may be created with low power consumption and low costs.

DETAILED DESCRIPTION

Embodiments of an image variable lighting apparatus according to the present disclosure will be described hereinafter with reference to the accompanying drawings. The terminology used herein is intended to appropriately describe preferred embodiments of the present disclosure, and may vary depending on the intentions of the user or operator or the conventions of the field to which the present disclosure pertains. Therefore, the definition of the terminology should be made according to the overall disclosure set forth herein.

Figure 1:
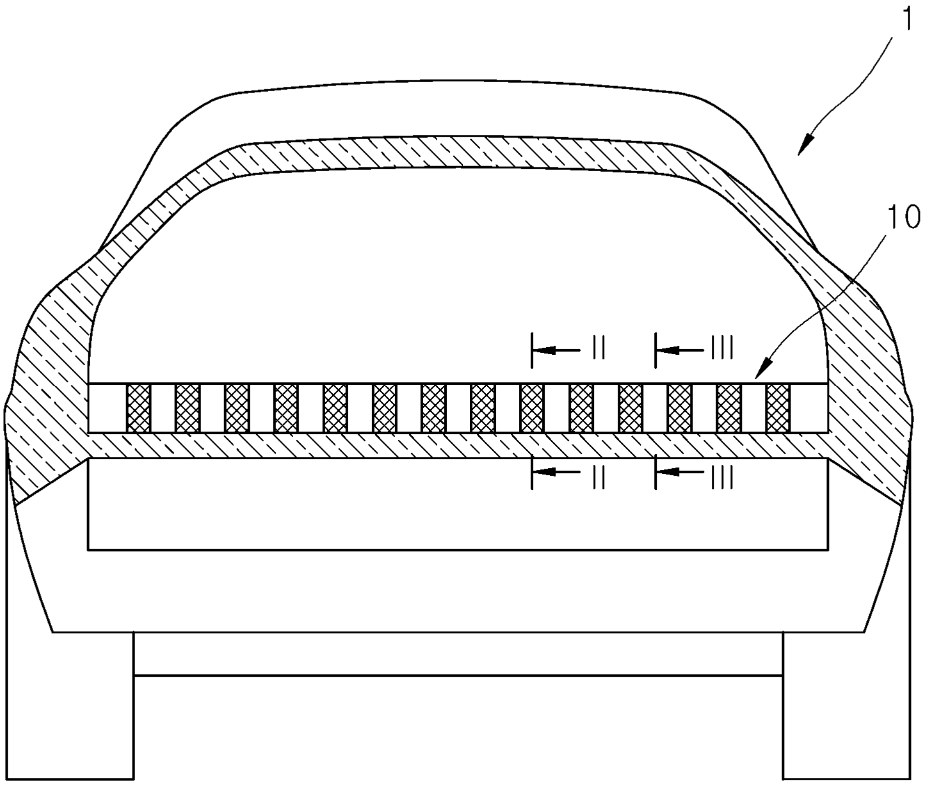
FIG. 1 is a front view showing an image variable lighting apparatus according to a first embodiment of the present disclosure in a first image mode.
Figure 2:
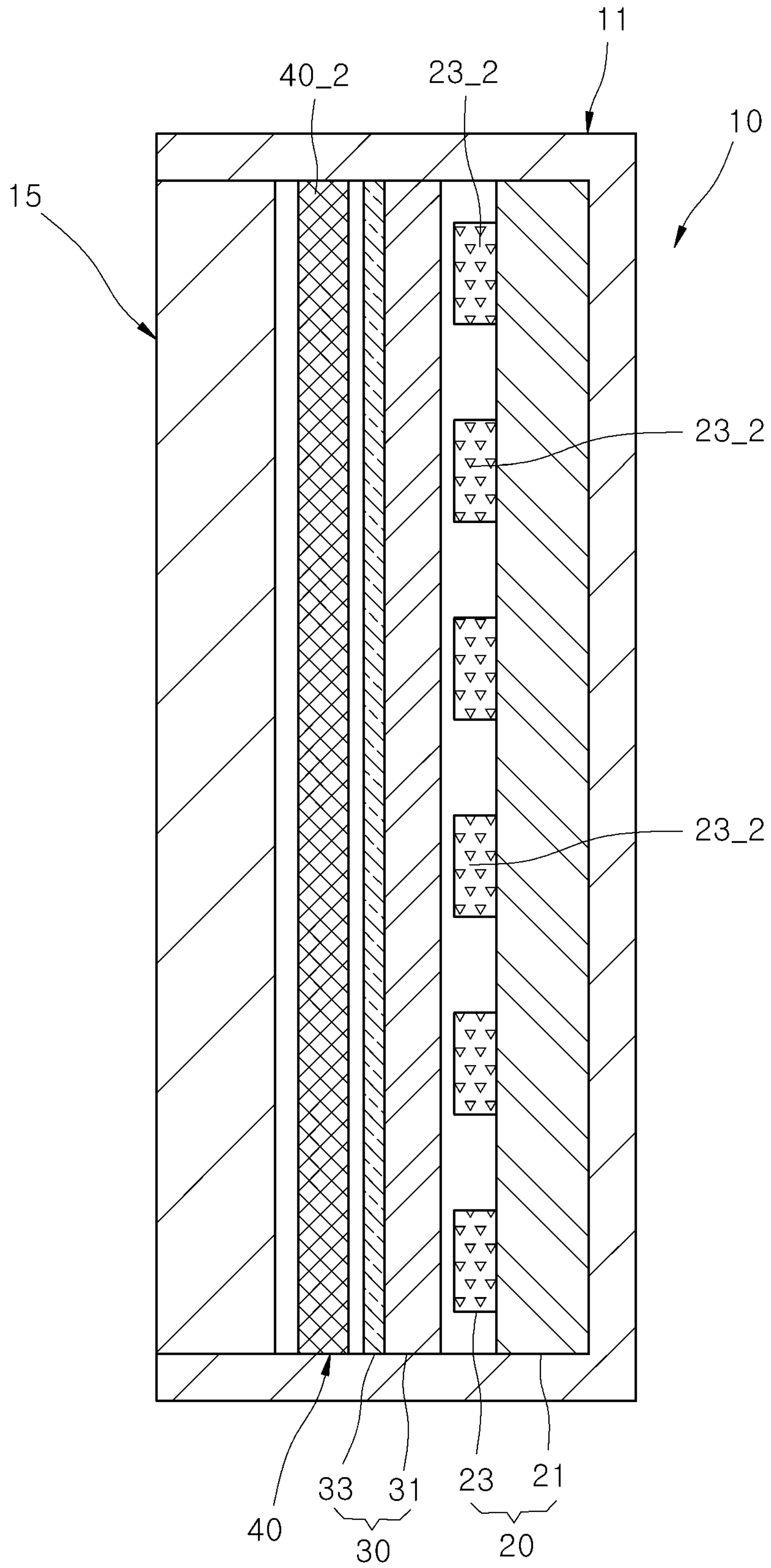
FIG. 2 is a cross-sectional view taken along line II-II of FIG. 1.
Figure 3:
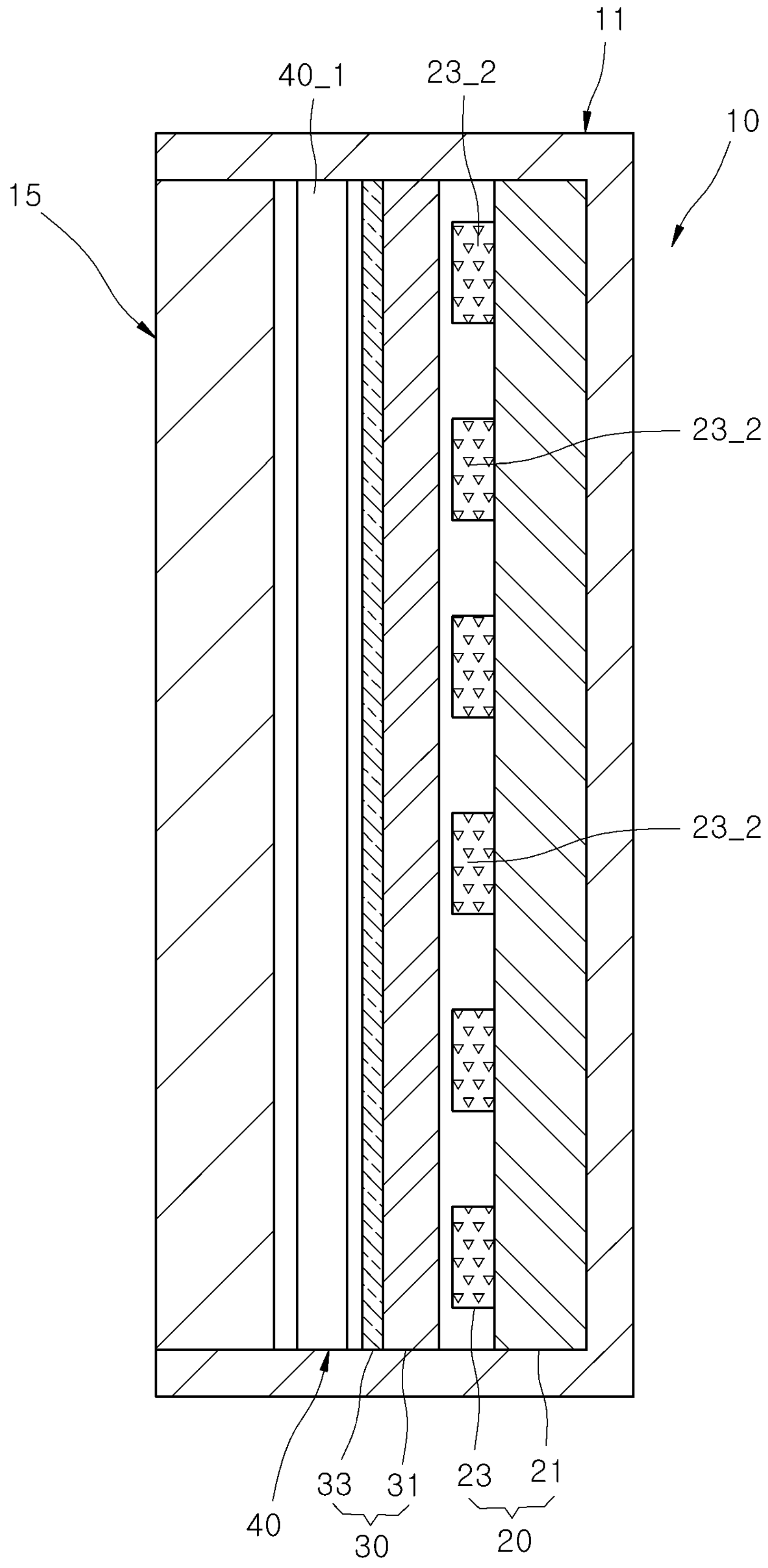
FIG. 3 is a cross-sectional view taken along line III-III of FIG. 1.
Figure 4:
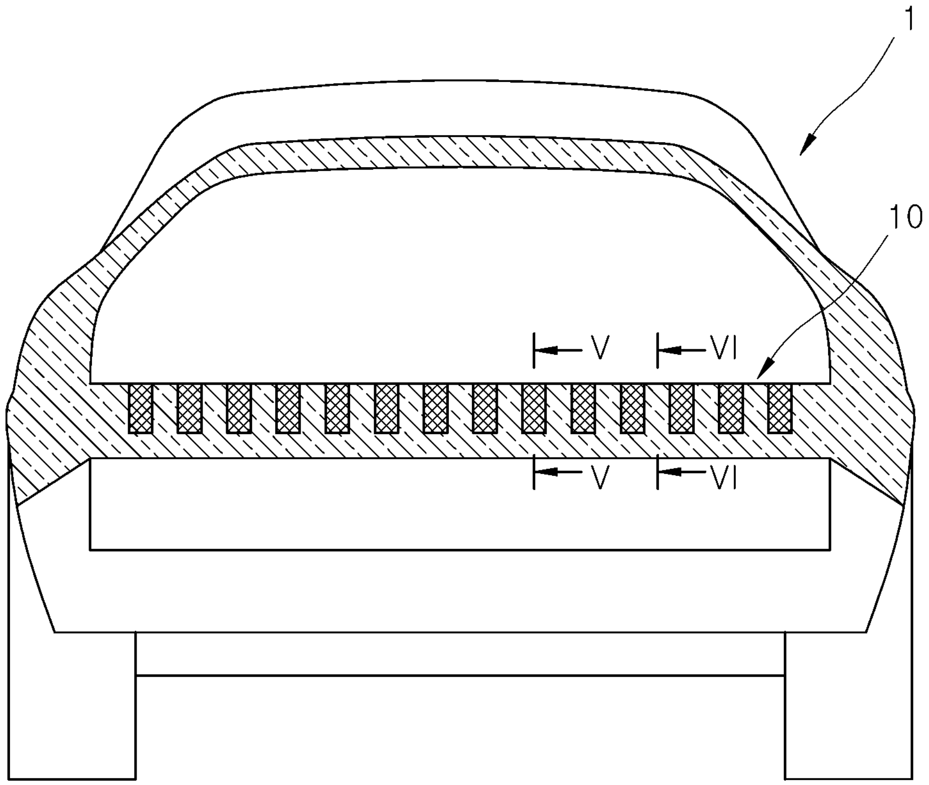
FIG. 4 is a front view showing an image variable lighting apparatus according to the first embodiment of the present disclosure in a second image mode.
Figure 5:
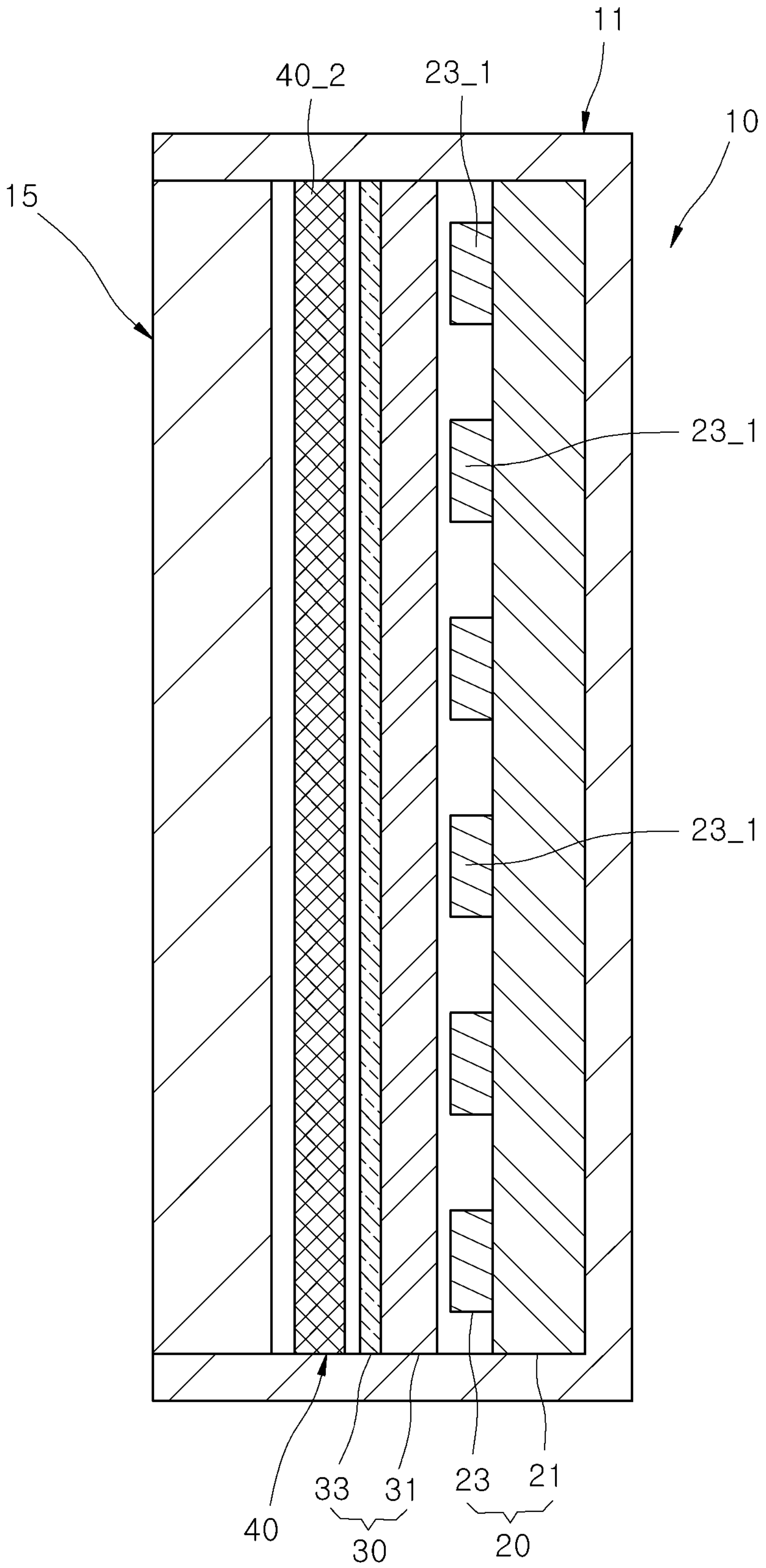
FIG. 5 is a cross-sectional view taken along line V-V of FIG. 4.
Figure 6:
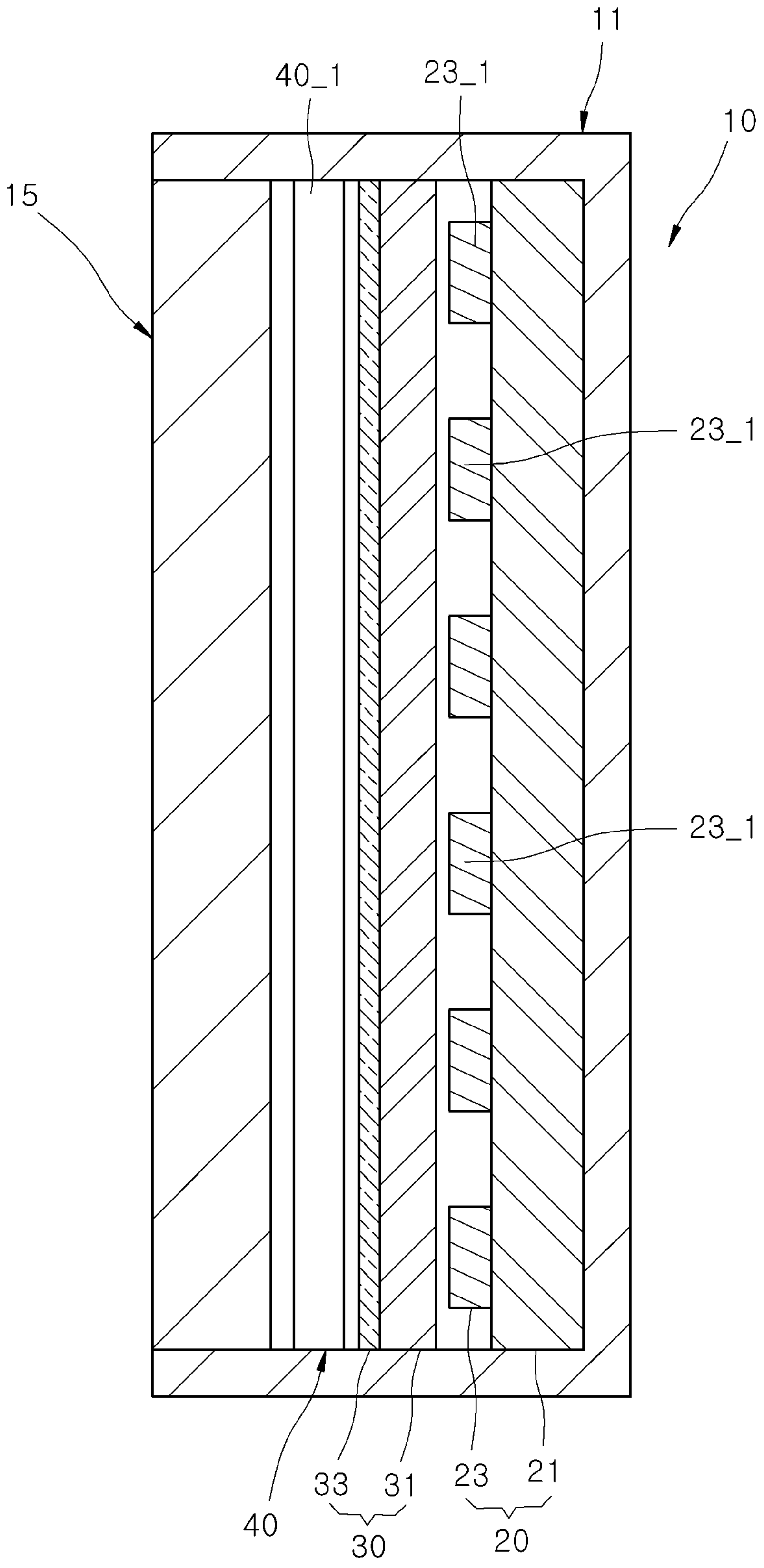
FIG. 6 is a cross-sectional view taken along line VI-VI of FIG. 4.
Figure 7:
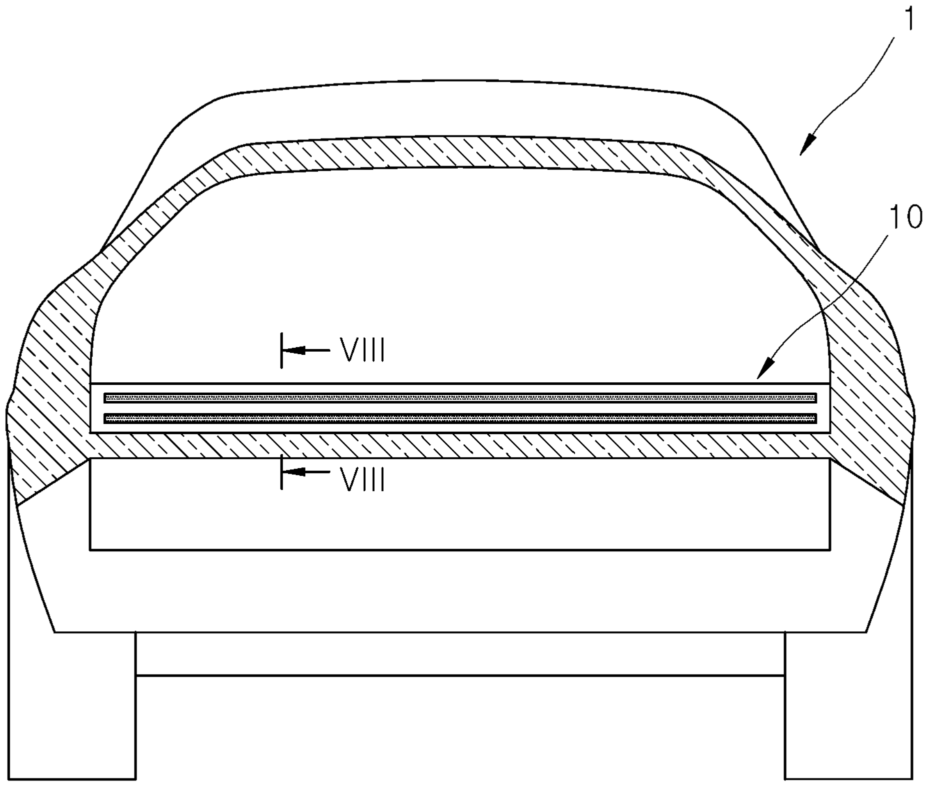
FIG. 7 is a front view showing an image variable lighting apparatus according to the first embodiment of the present disclosure in a third image mode.
Figure 8:
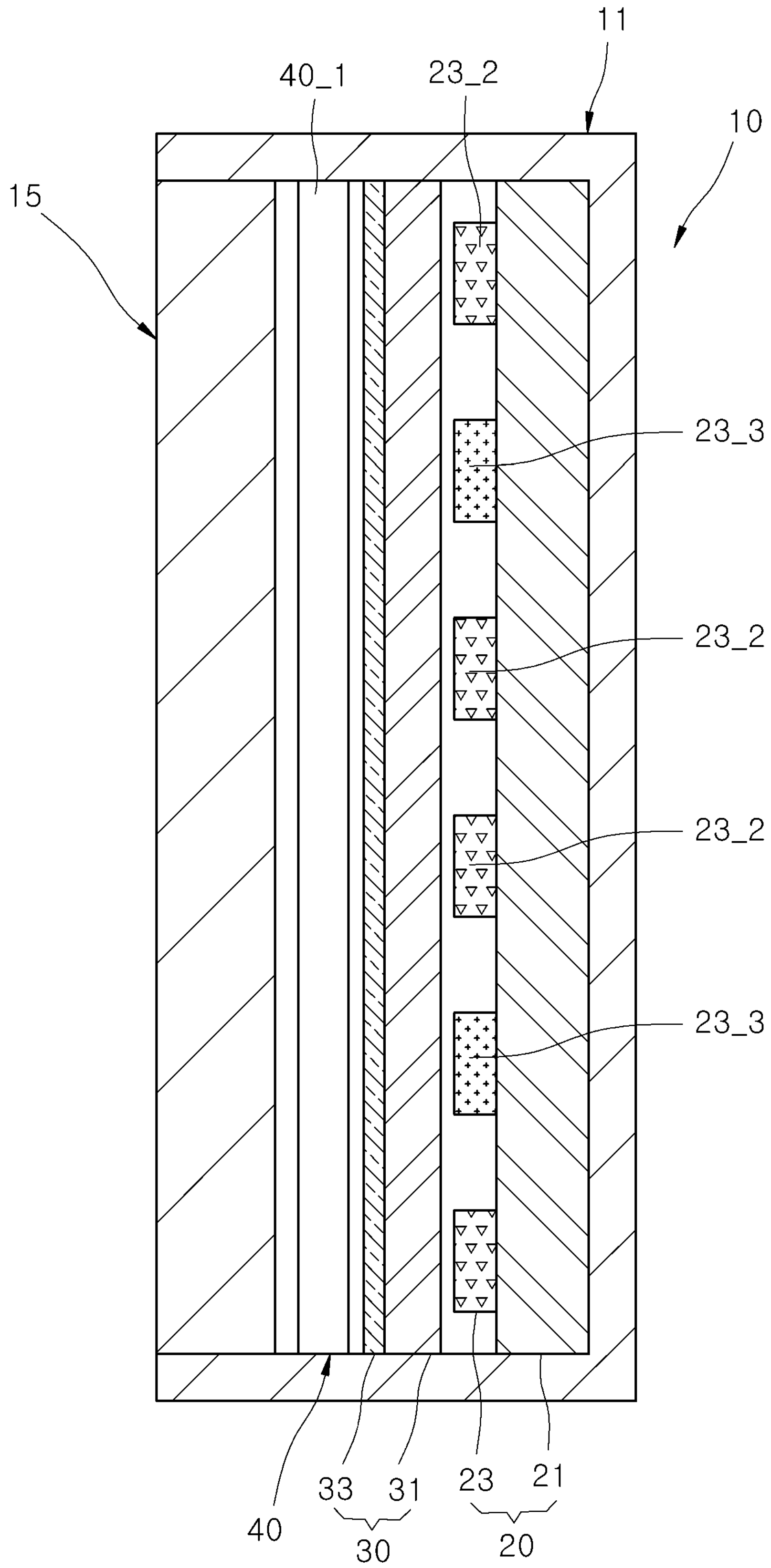
FIG. 8 is a cross-sectional view taken along line VIII-VIII of FIG. 7.
Figure 9:
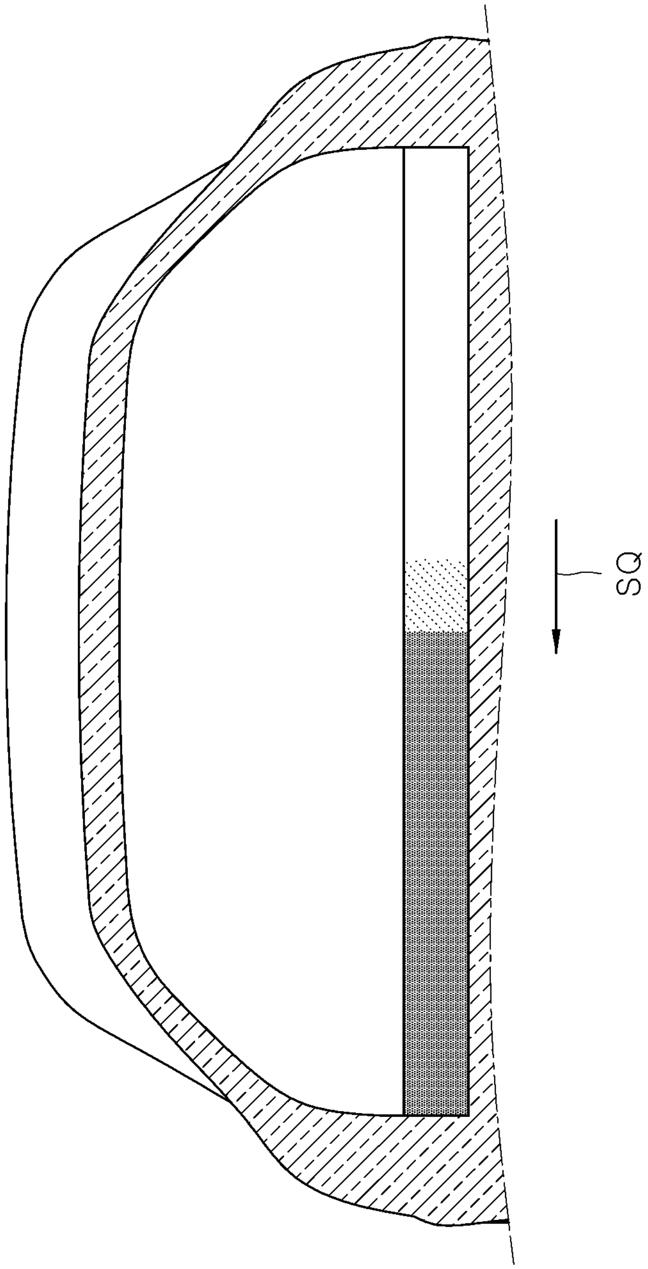
FIG. 9 is a front view showing an image variable lighting apparatus according to the first embodiment of the present disclosure in a fourth image mode.

FIG. 1 is a front view showing an image variable lighting apparatus according to a first embodiment of the present disclosure in a first image mode. FIG. 2 is a cross-sectional view taken along line II-II of FIG. 1. FIG. 3 is a cross-sectional view taken along line III-III of FIG. 1. FIG. 4 is a front view showing an image variable lighting apparatus according to the first embodiment of the present disclosure in a second image mode. FIG. 5 is a cross-sectional view taken along line V-V of FIG. 4. FIG. 6 is a cross-sectional view taken along line VI-VI of FIG. 4. FIG. 7 is a front view showing an image variable lighting apparatus according to the first embodiment of the present disclosure in a third image mode. FIG. 8 is a cross-sectional view taken along line VIII-VIII of FIG. 7. FIG. 9 is a front view showing an image variable lighting apparatus according to the first embodiment of the present disclosure in a fourth image mode.

Referring to FIGS. 1 to 9, an image variable lighting apparatus 10 according to a first embodiment of the present disclosure includes a light source portion 20 and a variable light-transmitting portion 40. The image variable lighting apparatus 10 may be installed, for example, on a rear surface of a vehicle 1. However, the image variable lighting apparatus 10 is not limited to what is shown in FIG. 1 and may be installed on a front surface or a side surface of the vehicle 1, or on a building or ornament.

The light source portion 20 emits light forward. The light source portion 20 includes an LED package 23 as a light source. The light source portion 20 may include a plurality of LED packages 23 and a circuit board 21 on which the plurality of LED packages 23 are mounted in an electrically conductive manner. The plurality of LED packages 23 may be evenly distributed across the entire area of the circuit board 21.

Each LED package 23 may include, for example, a red LED, a green LED, and a blue LED that project light in red R, green G, and blue B respectively when electrical energy is supplied. The LED package 23 may project light of various colors forward by turning on at least some of the red LED, green LED, and blue LED. However, the LED package 23 may also be configured to emit light of only one color or a limited range of colors.

The variable light-transmitting portion 40 is disposed in front of the light source portion 20. Transmittance of light passing through the variable light-transmitting portion 40 in the thickness direction changes depending on whether an electrical signal is input, specifically, whether an electric signal is input to the variable light-transmitting portion 40. The variable light-transmitting portion 40 may include, for example, an electrochromic device or an electrophoretic device.

The electrochromic device may be, for example, a polymer dispersed liquid crystal (PDLC) or a variable polarized liquid crystal (VPLC). The electrochromic device may include, for example, first and second transparent film layers arranged facing each other with a gap, first and second transparent electrode layers arranged between the first and second transparent film layers, an electrochromic material disposed between the first and second transparent electrode layers, and an electrolyte interposed between the first and second transparent electrode layers.

The electrochromic material may include, for example, any one of $WO_3$, NiO, Prussian blue (Pb), viologens, phenothiazine, Prussian blue analogues (PBA), metallophthalocyanines, vanadium oxide ($V_2O_5$), polypyrroles, polythiophenes, polyanilines, or $IrO_2$.

The electrophoretic device may include, for example, first and second transparent film layers arranged facing each other with a gap, first and second transparent electrode layers arranged between the first and second transparent film layers, an electrophoretic material disposed between the first and second transparent electrode layers, and an electrolyte interposed between the first and second transparent electrode layers. The electrophoretic material may include, for example, black particles with a positive (+) charge and white particles with a negative (−) charge. The black particles and white particles may be made of a cathodic coloration material or an anodic coloration material.

The variable light-transmitting portion 40 may include a plurality of non-overlapping cells distributed in a plane thereof. In the variable light-transmitting portion 40, light transmittance of the plurality of cells may be individually controlled.

The first transparent electrode layer may include a plurality of first transparent electrodes spaced apart from each other in parallel. The second transparent electrode layer may include a plurality of second transparent electrodes spaced apart from each other in parallel and orthogonal to the first transparent electrodes. A cell may be defined as an area including an intersection of one of the plurality of first transparent electrodes and one of the plurality of second transparent electrodes in the plane of the variable light-transmitting portion 40.

When one of the plurality of first transparent electrodes is charged with a negative (−) voltage and one of the plurality of second transparent electrodes is charged with a positive (+) voltage, it may be said that an electrical signal is input (ON) to a cell that includes an intersection of the first transparent electrode charged with the negative (−) voltage and the second transparent electrode charged with the positive (+) voltage.

In this way, when an electrical signal is input to specific cells of the variable light-transmitting portion 40, light transmission is blocked in the thickness direction of the variable light-transmitting portion 40 at the specific cells, allowing an opaque black to be visible on a front surface of these specific cells. As a result, an area overlapping with these specific cells may appear black on a front surface of the image variable lighting apparatus 10.

The area on the front surface of the image variable lighting apparatus 10 that appears black is indicated by the fine cross-hatched area in FIG. 1. In addition, the area of the variable light-transmitting portion 40 that appears black is indicated by the reference numeral '40_2' in FIG. 2.

In other cells of the variable light-transmitting portion 40 to which no electrical signal is input, light may pass through in the thickness direction of the variable light-transmitting portion 40, allowing a front surface of these other cells to appear transparent. The area of the variable light-transmitting portion 40 that appears transparent is indicated by the reference numeral '40_1' in FIG. 3.

The image variable lighting apparatus 10 may further include a semi-transparent portion 30 disposed in front of the light source portion 20. For example, the semi-transparent portion 30 may be disposed between the light source portion 20 and the variable light-transmitting portion 40. The semi-transparent portion 30 may include a transparent panel 31 and a paint layer 33 formed by applying and curing a semi-transparent paint of a predetermined color on one side of the transparent panel 31.

A color of the paint layer 33, which is a color of the semi-transparent portion 30, may be, for example, the same as a color of an installation portion where the image variable lighting apparatus 10 is installed. For example, the image variable lighting apparatus 10 may be installed on the vehicle 1, and the installation portion may be provided on a front, rear, or side of an outer surface of the vehicle 1. When the image variable lighting apparatus 10 is installed on the outer surface of the vehicle 1, the semi-transparent portion 30 and the outer surface of the vehicle 1 may have the same color.

The image variable lighting apparatus 10 may further include a housing 11 and a transparent cover 15. The light source portion 20, the semi-transparent portion 30, and the variable light-transmitting portion 40 may be housed inside the housing 11. The transparent cover 15 may be attached to the housing 11 to close an open front surface of the housing 11 and protect the light source portion 20, the semi-transparent portion 30, and the variable light-transmitting portion 40. The transparent cover 15 may be transparent, allowing light to pass therethrough in the thickness direction. Although not explicitly shown, the transparent cover 15 may include, for example, a lens, diffuser plate, or the like.

Referring to FIGS. 2 and 3, a plurality of light sources 23 may emit white light forward when electrical energy is supplied. In FIGS. 2 and 3, the light source 23 that emits white light is indicated by the reference numeral '23_2'. The area of the variable light-transmitting portion 40 to which an electrical signal is input is indicated by the reference numeral '40_2' in FIG. 2. As shown, since light transmission is blocked in this area, it appears black on the front surface of the image variable lighting apparatus 10.

The area of the variable light-transmitting portion 40 to which no electrical signal is input is indicated by the reference numeral '40_1' in FIG. 3 and is transparent, allowing light to pass therethrough. Therefore, white light projected forward from the light source 23_2 passes through the semi-transparent portion 30 and the variable light-transmitting portion 40 in sequence, and is then projected forward from the image variable lighting apparatus 10.

As white light passes through the semi-transparent portion 30, the color of the semi-transparent portion 30 may appear slightly in the forward direction. However, since the intensity of white light projected from the light source portion 20 is strong, an observer who does not look carefully at the front surface of the image variable lighting apparatus 10 may not notice any difference from white light.

As a result, an image alternately arranged with black areas and white areas, as shown in FIG. 1, may be displayed on the front surface of the image variable lighting apparatus 10.

Referring to FIGS. 5 and 6, when electrical energy is not supplied to the plurality of light sources 23, the plurality of light sources 23 do not emit light forward. In FIGS. 5 and 6, the light source 23 that does not emit light is indicated by the reference numeral '23_1'. The area of the variable light-transmitting portion 40 to which an electrical signal is input is indicated by the reference numeral '40_2' in FIG. 5. As shown, since light transmission is blocked in this area, it appears black on the front surface of the image variable lighting apparatus 10.

The area of the variable light-transmitting portion 40 to which no electrical signal is input is indicated by the reference numeral '40_1' in FIG. 6 and is transparent, allowing light to pass therethrough. In this case, light from outside the image variable lighting apparatus 10 enters the inside through the front surface of the image variable lighting apparatus 10, passes through the variable light-transmitting portion 40_1, and is reflected by the semi-transparent portion 30.

Since the intensity of light entering the inside of the image variable lighting apparatus 10 is not strong, light reflected by the semi-transparent portion 30 takes on the color of the semi-transparent portion 30, more specifically, the color of the paint layer 33 of the semi-transparent portion 30. The reflected light passes through the variable light-transmitting portion 40_1 and the transparent cover 15 again, projecting onto the front surface of the image variable lighting apparatus 10, such that the color of the paint layer 33 may be visible on the front surface of the image variable lighting apparatus 10.

As a result, an image alternately arranged with black areas and areas of the same color as the semi-transparent portion 30, as shown in FIG. 4, may be displayed on the front surface of the image variable lighting apparatus 10. As described above, when the semi-transparent portion 30 and the outer surface of the vehicle 1 have the same color, an observer may notice a series of black areas arranged in a line, spaced apart.

Referring to FIG. 8, a color of light emitted by the plurality of light sources 23, more specifically, LED packages 23 belonging to one group among the plurality of LED packages 23, may differ from a color of light emitted by LED packages 23 belonging to another group.

For example, in FIG. 8, the LED package 23 indicated by reference numeral '23_2' emits white light and the LED package 23 indicated by reference numeral '23_3' emits red light. An LED package 23_2 emitting white light may be disposed between the plurality of LED packages 23_3 emitting red light in an upward and downward direction.

The variable light-transmitting portion 40 to which no electrical signal is input is indicated by reference numeral '40_1' in FIG. 8 and becomes transparent to allow light to pass therethrough. Therefore, white light projected forward from one group of light sources 23_2 and red light projected forward from another group of light sources 23_3 pass through the semi-transparent portion 30 and the variable light-transmitting portion 40 in sequence, and are then projected forward from the image variable lighting apparatus 10.

As white light and red light pass through the semi-transparent portion 30, the color of the semi-transparent portion 30 may appear slightly in the forward direction. However, since the intensity of white light and red light projected from the light source portion 20 is strong, an observer who does not look carefully at the front surface of the image variable lighting apparatus 10 may not notice the color of the semi-transparent portion 30.

As a result, an image alternately arranged with white and red stripe areas in an upward and downward direction, as shown in FIG. 7, may be displayed on the front surface of the image variable lighting apparatus 10.

Referring to FIGS. 2, 3, and 9, at the start of the operation of the image variable lighting apparatus 10, all light sources 23 of the light source portion 20 are turned on to emit white light, and an electrical signal is input (ON) to the entire area of the variable light-transmitting portion 40 to make the variable light-transmitting portion 40 opaque (see '40_2' in FIG. 2).

The input of the electrical signal to the variable light-transmitting portion 40 is stopped (OFF) from the rightmost area of FIG. 9 so that the variable light-transmitting portion 40 becomes transparent. As time passes, the area of the transparent variable light-transmitting portion 40 expands in the direction of an arrow SQ by enlarging the area where the electrical signal input to the variable light-transmitting portion 40 is stopped. Accordingly, as shown in FIG. 9, the area appearing white on the front surface of the image variable lighting apparatus 10 may spread from right to left in the direction of the arrow SQ.

Figure 10:
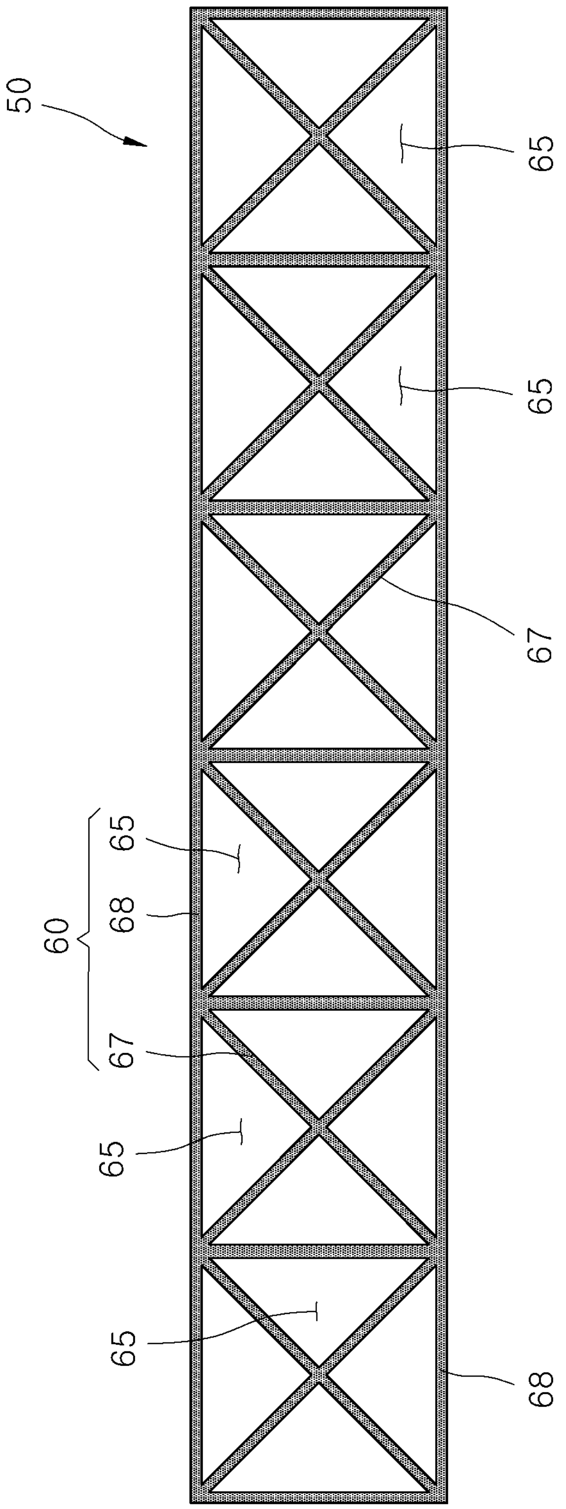
FIG. 10 is a front view showing an image variable lighting apparatus according to a second embodiment of the present disclosure.

FIG. 10 is a front view showing an image variable lighting apparatus according to a second embodiment of the present disclosure. Referring to FIG. 10, an image variable lighting apparatus 50 according to a second embodiment of the present disclosure includes a light source portion, a variable light-transmitting portion 60, and a semi-transparent portion, similar to the image variable lighting apparatus 10 according to the first embodiment of the present disclosure described with reference to FIGS. 1 to 9.

The light source portion and the semi-transparent portion are identical to the light source portion 20 and the semi-transparent portion 30 included in the image variable lighting apparatus 10 according to the first embodiment of the present disclosure. Therefore, redundant descriptions will be omitted.

The variable light-transmitting portion 60 is disposed in front of the light source portion. Transmittance of light passing through the variable light-transmitting portion 60 in the thickness direction changes depending on whether an electric signal is input to the variable light-transmitting portion 60. For example, when an electrical signal is input, the variable light-transmitting portion 60 may appear opaque black. When an electrical signal is not input, the variable light-transmitting portion 60 may become transparent, allowing light to pass therethrough. The variable light-transmitting portion 60 may include, for example, an electrochromic device or an electrophoretic device.

The variable light-transmitting portion 60 may include a plurality of non-overlapping cells 65 distributed therein. The variable light-transmitting portion 60 may further include an opaque boundary wall 67 and an opaque outer wall 68. The boundary wall 67 may be provided between a pair of adjacent cells 65 among the plurality of cells 65. The outer wall 68 may be provided along an outer perimeter of the variable light-transmitting portion 60.

The boundary wall 67 and the outer wall 68 may have a constant width and extend in a straight line. The boundary wall 67 and the outer wall 68 may be black, for example. Each cell 65 may have a planar shape, such as an isosceles triangle, equilateral triangle, rectangle, or hexagon. An electrical signal is individually input to the plurality of cells 65, allowing light transmittance of each cell 65 to be individually controlled.

The image variable lighting apparatus 10 and 50 described above include the variable light-transmitting portion 40 and 60 where light transmittance changes depending on an electrical signal. Therefore, the apparatus may create various images by changing lighting-up areas and lighting colors. By applying the image variable lighting apparatus 10 and 50 to an exterior design of the vehicle 1, various impressions of an exterior of the vehicle 1 may be created with low power consumption and low costs.

Although the present disclosure has been described with reference to embodiments illustrated in the drawings, the embodiment is for illustrative purposes only, and those skilled in the art will appreciate that various modifications and other equivalent embodiments can be made from the embodiment disclosed herein. Thus, the true technical scope of the present disclosure should be defined by the following claims.

What is claimed is:

1. An image variable lighting apparatus comprising:

a light source portion configured to emit light forward; and a variable light-transmitting portion disposed in front of the light source portion; and a semi-transparent portion disposed between the variable light-transmitting portion and the light source portion, wherein light transmittance of the variable light-transmitting portion changes depending on whether an electrical signal is input to the variable light-transmitting portion, and wherein the semi-transparent portion includes a semi-transparent paint layer of a predetermined color.

2. The image variable lighting apparatus of claim 1, wherein the variable light-transmitting portion includes an electrochromic device or an electrophoretic device.

3. The image variable lighting apparatus of claim 1, wherein, in response that the electrical signal is input to the variable light-transmitting portion, light transmission is blocked in a thickness direction of the variable light-transmitting portion.

4. The image variable lighting apparatus of claim 1, wherein, in response that the electrical signal is not input to the variable light-transmitting portion and the light source portion emits the light, the light emitted by the light source portion passes through the variable light-transmitting portion.

5. The image variable lighting apparatus of claim 1, wherein, in response that the electrical signal is not input to the variable light-transmitting portion and the light source portion does not emit light, a color of the semi-transparent paint layer is visible on a front surface of the image variable lighting apparatus.

6. The image variable lighting apparatus of claim 5, wherein the color of the semi-transparent paint layer is the same as a color of an installation portion where the image variable lighting apparatus is installed.

7. The image variable lighting apparatus of claim 1, wherein the light source portion includes a plurality of LED packages, and wherein a color of light emitted by LED packages belonging to one group among the plurality of LED packages differs from a color of light emitted by LED packages belonging to another group among the plurality of LED packages.

8. The image variable lighting apparatus of claim 1, wherein the variable light-transmitting portion includes a plurality of non-overlapping cells distributed therein, in which light transmittance of the plurality of cells is individually controlled by the electrical signal.

9. The image variable lighting apparatus of claim 8, wherein the variable light-transmitting portion further includes an opaque boundary wall provided between a pair of adjacent cells among the plurality of cells.

10. A vehicle comprising the image variable lighting apparatus of claim 1, mounted on a predetermined surface of the vehicle.

11. The image variable lighting apparatus of claim 1, wherein the semi-transparent paint layer of the semi-transparent portion and an installation portion disposed on a vehicle to install the image variable lighting apparatus, have the same color as an outer surface of the vehicle.

* * * * *